US006474552B1

(12) United States Patent
Ricard

(10) Patent No.: US 6,474,552 B1
(45) Date of Patent: Nov. 5, 2002

(54) PROCESS AND DEVICE FOR AVOIDING FRAUD IN A TAXI EQUIPPED WITH A TAXIMETER OF EXTRACTABLE TYPE

(76) Inventor: Claude Ricard, 1206 Fairfield Rd., Glencoe, IL (US) 60022

(*) Notice: Subject to any disclaimer, the term of this patent is extended or adjusted under 35 U.S.C. 154(b) by 0 days.

(21) Appl. No.: 09/457,345

(22) Filed: Dec. 8, 1999

(30) Foreign Application Priority Data

Dec. 11, 1998 (FR) ........................................... 98 16061

(51) Int. Cl.[7] ............................ G06K 5/00; G06K 7/08
(52) U.S. Cl. ....................... 235/382; 235/381; 235/384
(58) Field of Search ................................ 235/381, 384, 235/30 R, 33, 45, 382; 346/15; 705/417

(56) References Cited

U.S. PATENT DOCUMENTS

| | | | | |
|---|---|---|---|---|
| 2,870,018 A | * | 1/1959 | Person et al. | 426/246 |
| 4,167,040 A | * | 9/1979 | Heritier et al. | 235/30 R |
| 4,217,484 A | * | 8/1980 | Gerst | 235/30 A |
| 4,389,563 A | * | 6/1983 | Ricard | 235/30 R |
| 4,482,965 A | | 11/1984 | Tateishi et al. | 235/40 |
| 4,851,653 A | * | 7/1989 | Limisaque et al. | 235/492 |
| 4,998,205 A | * | 3/1991 | Ricard | 235/30 R |
| 5,155,747 A | * | 10/1992 | Huang | 377/16 |
| 5,323,139 A | * | 6/1994 | Isaki et al. | 340/426 |
| 5,349,326 A | * | 9/1994 | Yamada | 340/426 |
| 5,629,856 A | * | 5/1997 | Ricard | 235/30 R |
| 5,740,403 A | * | 4/1998 | Kowalski | 235/492 |
| 5,917,178 A | * | 6/1999 | De Hoog | 235/492 |
| 6,109,520 A | * | 8/2000 | Ricard | 235/30 R |

FOREIGN PATENT DOCUMENTS

| | | | |
|---|---|---|---|
| DE | 3624752 | | 6/1987 |
| DE | 4324762 | | 2/1995 |
| DE | 195 10 632 | | 9/1995 |
| EP | 0387474 | | 9/1990 |
| FR | 2716109 | * | 4/1996 |
| FR | 2726109 | | 4/1996 |
| FR | 2757299 | * | 6/1998 |
| FR | 2757m300 | * | 6/1998 |
| FR | 2757300 | | 6/1998 |
| JP | 09259308 A | * | 3/1997 |

* cited by examiner

*Primary Examiner*—Karl D. Frech
*Assistant Examiner*—Uyen-Chau N. Le
(74) *Attorney, Agent, or Firm*—Browdy and Neimark, P.L.L.C.

(57) ABSTRACT

This invention relates to a process and device for avoiding fraud in a taxi equipped with a taximeter of extractable type, and consequently generally provided with a male/female coupling connector.

It consists in providing, on each taxi receiving an extractable taximeter, a circuit memory which contains data for identifying the taximeter when it is connected to this taxi. This taximeter is prevented from functioning if such identification reveals that the taximeter is not the one which was calibrated for this taxi.

18 Claims, 1 Drawing Sheet

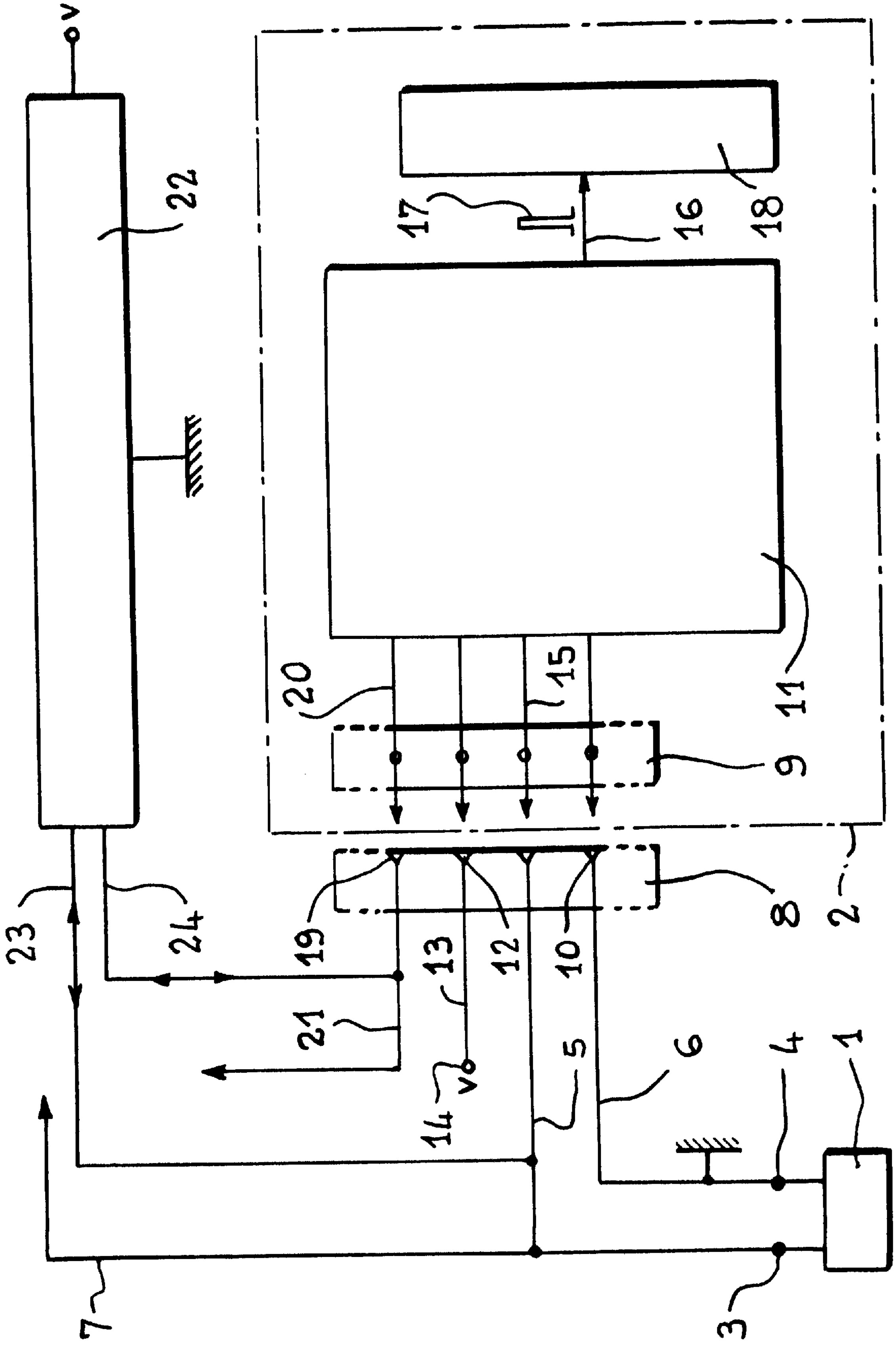
V
22
17
16
18
11
20
15
9
8
2
19
13
12
10
23
24
21
14
V
5
6
4
1
3
7

PROCESS AND DEVICE FOR AVOIDING FRAUD IN A TAXI EQUIPPED WITH A TAXIMETER OF EXTRACTABLE TYPE

FIELD OF THE INVENTION

The present invention relates to a process and to a device for avoiding fraud in a taxi equipped with a taximeter of extractable type.

BACKGROUND OF THE INVENTION

Generally, a taximeter is an apparatus whose object is to indicate the price to be paid for a journey made by the taxi, this price depending on several parameters, including, inter alia, the distance covered by the taxi, i.e., finally, the number of wheel revolutions made by this vehicle during the journey.

The sensor used for measuring this number of wheel revolutions is the sensor normally associated with the dashboard of the vehicle and therefore connected to the meter which indicates both the instantaneous speed of this vehicle and the mileage covered thereby.

Virtually all modern vehicles are equipped with an electromagnetic or electronic sensor for detecting the number of wheel revolutions, called "electronic sensor", which may for example be provided at the gear box and which is equipped with an output connector on which is connected a cable which collects and conveys the electric pulses representative of the number of wheel revolutions to a speedometer with which the dashboard is equipped. The dashboard is in that case conventionally equipped with an auxiliary output which is electrically connected in parallel on this cable, and on which is connected the corresponding input of the taximeter: the pulses which are conveyed on this cable therefore supply the speedometer of the vehicle and the taximeter simultaneously.

The installation of a taximeter consists, inter alia, in parameterizing it as a function of multiple data, such as the tariff to be applied, as well as the specific characteristics of the vehicle on which this taximeter is to be installed, and in mounting this taximeter on this vehicle. The characteristics specific to the vehicle are represented by the "characteristic coefficient" K which is different from one vehicle to the other.

Parameterizing is effected by the Weights and Measures Department, after which this official Service puts a seal on the taximeter and the parameterizing can no longer be altered by any one.

In numerous countries, to avoid theft or acts of vandalism, the taximeter is extractable and it is removed every evening, then replaced the next morning, by the driver of the vehicle.

Unfortunately, this gives the drivers and taxi companies the possibility of cheating by removing the taximeter from one vehicle and connecting it on another taxi, which is easy, for example, for a taxi company owning several vehicles.

As the taximeter is calibrated as a function of the number of pulses per kilometer and as this number of pulses per kilometer is a function of the characteristics specific to the vehicle, it is possible, by connecting a taximeter in a vehicle other than the one for which it is calibrated, to obtain on this other vehicle a larger number of pulses per kilometer. For this other vehicle, a higher price than what is due for each journey will thus be charged.

It is an object of the present invention to overcome this drawback.

SUMMARY OF THE INVENTION

To that end, it relates to a process for avoiding fraud in a taxi equipped with a taximeter of extractable type, by preventing this extractable taximeter from being used on another taxi, characterized in that it consists in providing on each taxi receiving an extractable taximeter, a circuit memory which contains data identifying the taximeter when the latter is connected in this taxi.

This taximeter is advantageously prevented from functioning if such identification proves that this taximeter is not the one which was calibrated for this taxi.

The invention also relates to a device for carrying out this process, applied to a taxi equipped to receive said extractable taximeter, characterized in that said circuit memory is wired on that part which remains permanently fixed on the vehicle, and in that at least one connection of this circuit memory is connected to the taximeter and typically to the central processing unit, or "C.P.U. ", of said taximeter.

This circuit memory is advantageously protected by a box sealed on the vehicle.

Said connection of the circuit memory is advantageously connected to the taximeter via a connector which, on removably receiving the extractable taximeter, allows this taximeter to be connected to the battery of the vehicle, and/or to the distance sensor, and/or to the roof sign.

According to a particular embodiment, said circuit memory is another processing unit which is different from the central processing unit of the taximeter.

The electrical wires which connect this circuit memory to said taximeter are advantageously wires which already exist for other purposes in the electrical circuit of the vehicle, in connection with the functioning of its taximeter, for example the wire or wires used for controlling the lamps of the roof sign, typically of the "free" lamp and/or of the tariff light repeater normally placed on the vehicle roof, and/or the wire or wires coming from the sensor detecting the number of wheel revolutions.

BRIEF DESCRIPTION OF THE DRAWINGS

The invention will be more readily understood on reading the following description with reference to the accompanying drawing, in which:

The single FIG. is a diagram representing the invention.

DESCRIPTION OF PREFERRED EMBODIMENT

Referring now to this FIGURE, reference 1 designates the electronic sensor which is mounted on the vehicle in order to operate the taximeter 2.

A so-called "electronic" sensor of an automobile vehicle is a transducer which tests a rotating mechanical member of the vehicle, the speed of rotation of this mechanical member being representative of the number of wheel revolutions made by the vehicle, and the generally A.C. electric signal furnished by this transducer corresponding to electric pulses representative of this number of wheel revolutions. This rotating mechanical member is conventionally most often one of the pinion gears of the gear box. However, modem vehicles are nowadays provided more and more often with a so-called "A.B.S." braking system which uses an electronic sensor for each wheel of the vehicle, and, in that case, one of these sensors is used for operating the taximeter. These vehicles are generally equipped with disc brakes on the four wheels and consequently each electronic sensor is a proximity sensor which tests the presence of notches made to that end on the outer edge of the brake disc.

The sensor 1, which is therefore in practice placed either at the gear box or on one of the wheels of the vehicle, therefore delivers on its output terminals 3, 4, pulses representative of the number of wheel revolutions made by the vehicle.

These pulses are applied on the one hand, via the line connection 5 and the ground connection 6, to the taximeter 2 and, on the other hand, by the connection 7, to the speed and mileage metering circuits which form part of the dashboard of the vehicle, and possibly to the "A.B.S." braking circuits of this vehicle.

The taximeter 2 being of extractable type, the wires 5 and 6 terminate at a female mutipole connector 8 which is permanently fixed on the vehicle and which is provided to be coupled to a conjugate male multipole connector 9 which forms part of the extractable taximeter It should be noted that a terminal 10 of the connector 8 is connected to the ground wire 6, and thus ensures ground continuity, while another terminal 12 of this connector 8 is connected, via a connection wire 13, to a terminal 14 supplying D.C. voltage V, this terminal 14 itself being connected to the battery of the vehicle.

In the taximeter 2, the pulses coming from the sensor 1 are applied, via the connector 9 and the connection 15, on one of the inputs of a microprocessor 11 which constitutes the central processing unit or "C.P.U." of this taximeter. In response, this microprocessor 11 emits, on an output 16, pulses 17 whose frequency is representative, taking into account the parameters previously introduced in the microprocessor 11 by the Weights and Measures Department, of the number of wheel revolutions effected by the vehicle since the taximeter was actuated.

The pulses 17 are applied, as is proper, to the circuit 18 metering and displaying the price to be paid.

Furthermore, one of the terminals 19 of the connector 8 receives from the microprocessor 11 of the taximeter, via an output 20 thereof and the connector 9, data relative to the "FREE" or "NON-FREE" state of the taximeter and possibly, depending on the country, data relative to the tariff presently selected for the journey underway, all this data being transmitted, via a connection 21, to the light repeater which is generally provided on the vehicle roof.

According to the invention, there is also installed on the vehicle a circuit memory 22 of a model for example available on the market and preferably a memory of $E^2$PROM type with series linkage, in which, on the one hand, the secret code, direct or encoded, of the taximeter 2 and, on the other hand, the preferably encoded value of the characteristic coefficient K of the vehicle, were recorded when the taximeter was calibrated by the Weights and Measures Department.

This circuit memory 22 is advantageously protected by a box which is sealed on the taxi.

This memory 22 is connected to the microprocessor 11 of the taximeter via the two connectors 8 and 9 and, for maximum economic profitability, its two connections, respectively interrogation 23 and response 24, which will serve to dialogue with the microprocessor 11, are provided to use the connection wires 5 and 21 of the sensor 1 and of the roof repeater with the connector 8, which avoids providing other terminals on this connector and on the connector 9.

The device functions as follows:

When the taximeter 2 is switched on, i.e. when it is connected and during its first passage into "FREE" position, the microprocessor 11 interrogates the memory 22 via connections 20, 21, 24 and 15, 5, 23, and consequently determines whether its secret code and its characteristic coefficient K correspond to those recorded in this memory 22.

If these data tally, the microprocessor 11 then allows subsequent passage of the taximeter 2 into tariff position.

If, on the contrary, these data do not tally, the microprocessor 11 blocks operation of the taximeter 2, which can in that case no longer pass into tariff position as long as it remains connected on the connector 8.

An error signal is then advantageously displayed on the display screen of the taximeter. The error of connection may, in effect, not have been made in bad faith, and, in that case, the taxi driver must know immediately why it is impossible to actuate his taximeter and be able to change it before having already departed to park at a taxi stand.

It goes without saying that the invention is not limited to the embodiment which has just been described.

For example, the circuit memory 22 may be replaced by a microprocessor other than that of the taximeter and, in that case, it would be the memory of this other microprocessor which would be used as memory 22.

Also, it is possible to render the identification data furnished to the microprocessor 11 by the memory 22 secure, by coding it with a data-securing part, advantageously by using for this securing part a code of cyclic redundant code ("C.R.C.") type, largely known to coding specialists. Such a code makes it possible to check that the data, which was previously introduced in the memory 22, has not been subsequently altered. This cyclic redundant code will advantageously be calculated, using the secret code of the taximeter and the characteristic coefficient K of the vehicle (in direct form or in encoded form), the latter in particular not being able, in any case, to be altered by a defrauder due to the seal placed by the Weights and Measures Department.

As mentioned above, it is advantageous to use, for circuit 22, a memory of $E^2$PROM type with a series linkage in order to minimize the number of wires and to allow an easy dialogue with the central processing unit 11 of the taximeter. However, the memory 22 may also be produced by one or more electronic circuits each having a particular characteristic, for example one or more resistances of given value or a resonant circuit at a given frequency.

In a variant embodiment, the circuit memory 22 may be connected to the taximeter 2 by a linkage of opto-electronic type, by a linkage of electromagnetic type, or the like.

What is claimed is:

1. Process for avoiding fraud in a taxi equipped with an extractable taximeter, by preventing the extractable taximeter from being used on another taxi, wherein the process comprises a step of providing, on at least one taxi receiving an extractable taximeter, a circuit memory which contains data identifying a specific taximeter.

2. The process of claim 1, wherein the taximeter is prevented from functioning if such identification proves that the taximeter is not the one which was calibrated for the taxi.

3. The process of claim 2, wherein an error message is, in addition, displayed.

4. The process of claim 1, wherein the identification data contained in said circuit memory includes, directly or encoded, a characteristic coefficient K of the taximeter.

5. The process of claim 1, wherein the identification data contained in said circuit memory includes, directly or encoded, a secret code of the taximeter.

6. The process of claim 1, wherein the identification data contained in said circuit memory is rendered secure.

7. The process of claim 6, wherein such securization is effected by using a cyclic redundant code.

8. Device for carrying out the process of claim 1, applied to a taxi equipped to receive said extractable taximeter, wherein said circuit memory is wired on that part which remains permanently fixed on the taxi, and at least one connection of this circuit memory is connected to the taximeter.

9. The device of claim 8, wherein the circuit memory is protected by a box sealed on the taxi.

10. The device of claim 8, wherein said connection of the circuit memory is connected to a central processing unit, or "C.P.U." of said taximeter.

11. The device of claim 8, wherein the circuit memory is connected to the taximeter by an optoelectronic linkage.

12. The device of claim 8, wherein said circuit memory is connected to the taximeter by an electromagnetic linkage.

13. The device of claim 8, wherein said circuit memory is connected to the taximeter via a connector which, on removably receiving the extractable taximeter, enables the taximeter to be connected to a battery of the taxi, and/or to a distance sensor, and/or to a roof sign.

14. The device of claim 8, wherein said circuit memory is an $E^2$PROM memory.

15. The device of claim 8, wherein said circuit memory is another processing unit which is different from the central processing unit of the taximeter.

16. The device of claim 8, wherein the circuit memory is produced by one or more electronic circuits each having a particular characteristic.

17. The device of claim 8, wherein electrical wires which connect the circuit memory to said taximeter are wires which already exist for other purposes in the electrical circuit of the vehicle, in connection with functioning of the taximeter.

18. The device of claim 17, wherein said electrical wires are the wire or wires used for controlling lamps of the roof sign, and/or a wire or wires coming from a distance sensor.

* * * * *